July 14, 1953  A. E. GALLANT ET AL  2,645,220
FRACTURE NAIL INSERTER
Filed March 16, 1950
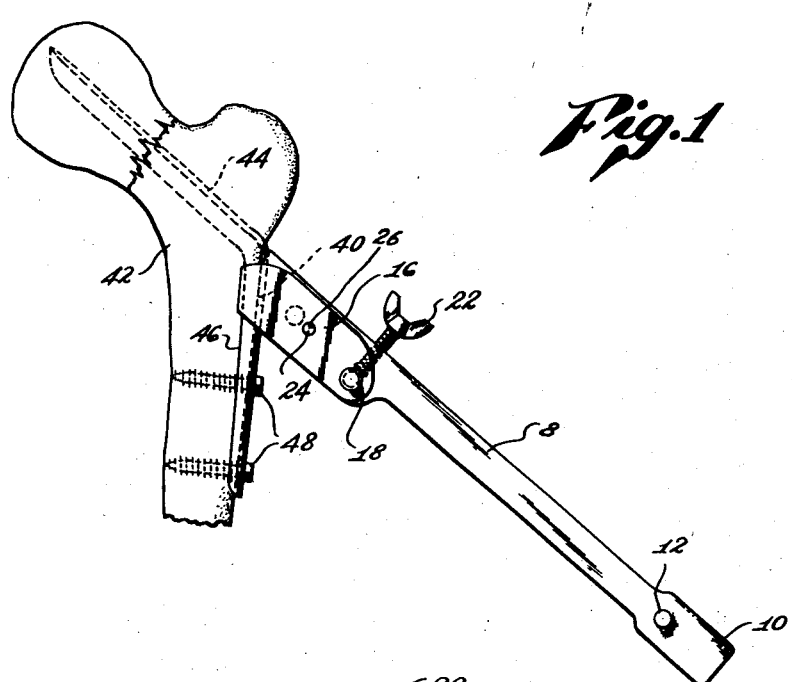
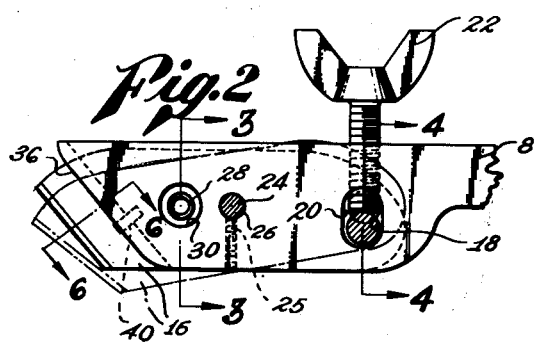
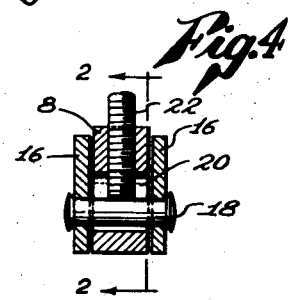
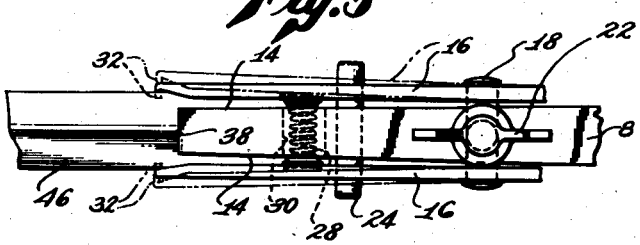
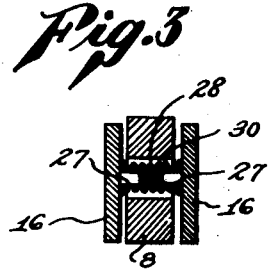
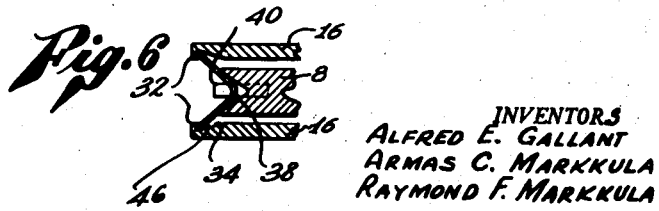
INVENTORS
ALFRED E. GALLANT
ARMAS C. MARKKULA
RAYMOND F. MARKKULA
BY *Edward S. Kendrick*
Attorney

Patented July 14, 1953

2,645,220

UNITED STATES PATENT OFFICE 2,645,220

FRACTURE NAIL INSERTER

Alfred E. Gallant and Armas C. Markkula, Los Angeles, and Raymond F. Markkula, North Hollywood, Calif.

Application March 16, 1950, Serial No. 150,075

8 Claims. (Cl. 128—83)

The invention relates to a fracture nail inserter and is particularly adapted for holding and inserting an angular nail having a bone penetrating portion and an angularly disposed extension adapted to be secured to the bone adjacent the point of entry of the penetrating portion.

While it may be susceptible of other uses, the tool is especially adapted for, and described herein in connection with, the nailing of the broken neck or head portion of a femur.

It is an object of the invention to provide an inserter for fracture nails which will firmly grip the nail and maintain a positive grip during the driving operation.

Another object is to provide an inserting tool which can be conveniently attached to the nail and readily released therefrom.

A further object is to provide a tool wherein hammer blows thereon will be transmitted in a direct line longitudinally of the nail.

Still another object is to provide an inserting tool which is particularly adapted for holding and inserting a fracture nail having an angular extension.

Other objects and advantages will be brought out in the following detailed description in connection with the accompanying drawing, wherein:

Fig. 1 is a side elevational view of the inserter shown in conjunction with a fracture nail which has been inserted in a fractured femur neck;

Fig. 2 is a section taken on the line 2—2 of Fig. 4 showing one position of the gripping jaws in full lines and a second position in broken lines;

Fig. 3 is a section taken on the line 3—3 of Fig. 2;

Fig. 4 is a section taken on the line 4—4 of Fig. 2;

Fig. 5 is a fragmentary plan view of the end of the tool shown in Fig. 2, shown in conjunction with a portion of a fracture nail, and with the gripping jaws in alternate positions in full and dotted lines; and Fig. 6 is a sectional view taken approximately on the line 6—6 of Fig. 2.

The tool has a shank 8, which may conveniently be of solid metal such as stainless steel. It has an enlarged outer end 10 which is adapted to receive mallet blows. This end is provided with a cross pin 12 which serves as a handle and facilitates withdrawal of fracture nails when desired.

The other end of the shank 8 is tapered as shown at 14 in Fig. 5. Lying at the sides of the tapered portion are nail gripping jaws 16. They are loosely mounted at their rear ends on a rivet 18 which in turn is located in a slot 20 which is elongated transversely in the shank 8. A thumbscrew 22 is threaded into the shank 8 and adapted to bear against the rivet 18 for a purpose to be brought out below.

A pin 24 extends through the tapered shank portion 14 in which it is firmly anchored by a set screw 25. The pin 24 extends through apertures 26 in the nail gripping jaws 16. These apertures loosely receive the ends of the pin 24, which serves as a fulcrum about which the jaws have limited movement.

Each nail gripping jaw has an inwardly projecting spring seat 27 which serves as a centering device for a helical spring 28, said spring lying in an aperture 30 which extends through the tapered shank portion 14 and urges apart the left hand, or outer ends of the nail gripping jaws 16.

The outer ends of the jaws 16 have hooked portions 32 which lie beyond the end of the tapered shank portion 14. These hooked portions are formed by cutting notches 34 in the ends of the jaws.

The end face 36 of the tapered end 14 of the tool shank 8 is formed on a diagonal across the shank. This end face is provided with a V-shaped groove 38 having a fracture nail anchor in the form of a pin 40 extending from the bottom of the groove intermediate its ends.

Fig. 1 shows a fractured femur 42 with a fracture nail 44 driven into it to hold the broken portions together. The nail has an angularly disposed extension 46 which extends along the shaft of the femur and is held by screws 48.

Our tool is shown in Fig. 1 to be gripping the nail 44 at the upper part of the angular extension 46. The nail is shown in Fig. 6 to be V-shaped in cross section.

When a fracture nail is to be gripped by the tool, the thumbscrew 22 is retracted so the jaw connecting rivet 18 can move upwardly in the slot 20, permitting the outer ends of the nail gripping jaws 16 to swing a short distance downwardly and away from the diagonal end face 36 as shown in broken lines in Fig. 2. The jaws 16 will be yieldably held in a spread position by the transverse spring 28 as shown in broken lines in Fig. 5.

The fracture nail is placed in the V-shaped groove 38 with the nail anchoring pin 40 extending through an aperture which is normally provided for one of the screws 48 which secures the nail extension 46. It will be noted in Fig. 1 that two screws 48 are shown. A third screw would ordinarily be present at the location of the nail anchoring pin 40 when the nail is finally secured to the femur shaft.

With the fracture nail extension 46 held in the V-shaped groove 38, the nail gripping jaws 16 are pressed toward each other by hand and the thumbscrew 22 is turned into the tool shank 8. The inner end of the thumbscrew will push on the rivet 18 and cause the hooked ends of the jaws 16 to swing toward the diagonal end face 36 of the shank of the tool. This will grip the nail between the jaws and said diagonal face 36 and hold the nail firmly in the tool.

The nail is then placed at the proper spot and driven into the bone and across the line of fracture by hammering on the tool shank end 10. It will be seen that the shank of the tool and the longitudinal axis of the nail 44 are in alignment, so that the impact thrust on the tool is transmitted in a straight line to the entering nail point.

The nail anchoring pin 40 prevents the nail extension 46 from slipping in the jaws 16 when hammer blows are struck on the tool, and the tool and nail will therefore be kept in proper alignment.

While Fig. 1 shows the tool gripping the nail and screws securing the nail extension to the bone, it is to be understood that the tool is ordinarily removed after the nail is driven into place and before the screws are inserted. The screws 48 are included in Fig. 1 merely to illustrate the manner in which the nail is secured.

It should be understood that changes can be made in specific details without departing from the spirit of the invention.

We claim:

1. A fracture nail inserter having in combination: a shank having an end face and two opposite side faces adjacent said end face; a pair of jaw members lying against said side faces, respectively, and having outer ends extending beyond said end face, said extended outer ends having laterally directed jaw portions; means pivotally supporting said pair of jaw members on said shank for rotation about an axis intersecting said side faces, whereby said jaw members may be rotated to move said jaw portions towards and away from said end face; and manually operable jaw actuating means on said shank to swing said pair of jaw members in unison in the same rotary direction to move said jaw portions towards said end face to cooperate with the end face for gripping a fracture nail.

2. A fracture nail inserter as set forth in claim 1, in which each of said jaw members is slidingly mounted on said pivot means for movement relative thereto to permit relative movement between said jaw portions.

3. A fracture nail inserter as set forth in claim 2, which includes yielding means acting between said jaw members to tend to spread the jaw members apart.

4. A fracture nail inserter as set forth in claim 1 which includes means interconnecting the inner ends of said two jaw members and in which said manually operable means is positioned and adapted to transmit force to said interconnecting means to swing said jaw portions toward said end face.

5. A fracture nail inserter as set forth in claim 4 in which said manually operable means comprises a screw member threaded into said shank transversely thereof.

6. A fracture nail inserter as set forth in claim 1 in which said jaw portions are hook-shaped to engage the side edges of a fracture nail.

7. A fracture nail inserter as set forth in claim 6 in which said pivotal means loosely supports said jaw members and means loosely interconnects the inner ends of said jaw members to permit the jaw members to be expanded and contracted relative to each other.

8. A fracture nail inserter as set forth in claim 7 which includes spring means urging said two jaw members apart.

ALFRED E. GALLANT.
ARMAS C. MARKKULA.
RAYMOND F. MARKKULA.

References Cited in the file of this patent

UNITED STATES PATENTS

| Number | Name | Date |
| --- | --- | --- |
| 1,204,208 | Thull | Nov. 7, 1916 |
| 2,235,419 | Callahan | Mar. 18, 1941 |
| 2,536,296 | Longfellow | Jan. 2, 1951 |

OTHER REFERENCES

The Journal of Bone and Joint Surgery for Oct. 1944, pg. 707.